United States Patent [19]
Drutel et al.

[11] Patent Number: 5,085,072
[45] Date of Patent: Feb. 4, 1992

[54] DETECTION PROCESS AND DEVICE FOR AN ELECTRONIC INJECTION SYSTEM OF A MULTICYLINDER ENGINE

[75] Inventors: Yves Drutel, Brignais; Denis Ranc, Saint Priest, both of France

[73] Assignee: Renault Vehicules Industriels, Lyons, France

[21] Appl. No.: 562,273

[22] Filed: Aug. 3, 1990

[30] Foreign Application Priority Data

Aug. 3, 1989 [FR] France .................. 89 10488

[51] Int. Cl.⁵ .................................. G01M 19/00
[52] U.S. Cl. .................................. 73/119 A
[58] Field of Search ............. 73/119 A, DIG. 3; 307/515

[56] References Cited

U.S. PATENT DOCUMENTS 3,786,272  1/1974  Gamble et al. .............. 73/DIG. 3
4,574,756  3/1986  Ito et al. ..................... 73/119 A X

*Primary Examiner*—Jerry W. Myracle
*Attorney, Agent, or Firm*—Oblon, Spivak, McClelland, Maier & Neustadt

[57] ABSTRACT

A detection device, for an injection pump of a motor vehicle engine, for measuring the speed of rotation of the engine, pinpointing angularly the top dead center corresponding to each cylinder of the engine and performing static timing of the injection pump. The device includes a multipolar ring of alternate polarity mounted on the rotation shaft of the pump inside the latter, the poles being grouped in a number of identical sectors corresponding to the number of cylinders of the engine; a sensor sensitive to magnetic field, mounted inside the pump opposite the ring; and an electronic processing interface connected, on the other hand, to the sensor, and on the other hand, to a computer for control of the electronic injection. The multipolar ring produces a varying magnetic field which is sensed by the sensor, and waveshaped and converted into a digital signal for application to a computer for control of electronic injection.

11 Claims, 1 Drawing Sheet

DETECTION PROCESS AND DEVICE FOR AN ELECTRONIC INJECTION SYSTEM OF A MULTICYLINDER ENGINE

BACKGROUND OF THE INVENTION

1. Field of the Invention

This invention relates to a process and device for detection of the angular position and the angular speed of the rotation shaft of the injection pump of a multicylinder engine. More particularly, this invention also relates to a detection device for the injection system of a multicylinder engine, in particular of a motor vehicle engine, making it possible to detect the speed of rotation of the engine, to perform permanently an angular pinpointing of the top dead center of each cylinder of the engine and to adjust the static timing of the injection pump of the engine.

2. Discussion of the Background

In the existing systems, the static timing of an injection pump relative to the engine is performed with a specific sensor which is different from the sensor for detection of speed and of angular pinpointing of top dead center. Moreover, the detection of speed and the angular pinpointing are performed be means of a magnetic field variation created between the sensor and a ferromagnetic toothed ring. The sensitivity of measurement, by this technique, becomes mediocre when the speed of rotation of the engine is low.

SUMMARY OF THE INVENTION

Accordingly, one object of this invention is to provide a novel detection process and device which eliminates the drawbacks of the standard systems by means of a compact detection device having a new structure.

Another object of this invention is to produce a multifunction detector including a multipolar magnetic ring and a single sensor sensitive to the magnetic field, for example a Hall-effect sensor.

Still a further object is to provide a novel process of detection of the angular position and the angular speed of the rotation shaft of the injection pump of a multicylinder engine with a multipolar magnetic ring and a single Hall-effect sensor or the equivalent.

These and other objects are achieved by providing the detection device according to the invention, which makes it possible to equip the injection pump of a multicylinder engine, such as an engine for a motor vehicle, and is intended in particular to measure the speed of rotation of the engine, to pinpoint angularly the top dead center corresponding to each cylinder of the engine and to perform a static timing of the injection pump.

According to the invention, the device includes a rigid ring mounted inside the pump and on the rotation shaft of the pump; a sensor which is sensitive to the magnetic field, such as a Hall-effect sensor mounted inside the pump and opposite the ring; and an electronic processing interface connected, on the one hand, to the sensor, and on the other hand, to a computer for control of the electronic injection. The rigid ring circumferentially includes multiple north and south magnetic poles distributed alternately over the entire circumference of the ring. The magnetic poles are grouped in geometrically identical sectors, the number of which corresponds to the number of cylinders of the engine. Each sector includes at least two small consecutive poles of small angular extent and a large pole of more significant angular extent at one end.

According to a preferred embodiment of the invention, all the small magnetic poles of the ring are geometrically identical. The large poles, the number of which corresponds to the number of cylinders of the engine, are also geometrically identical and distributed regularly over the circumference of the ring.

In the case where the engine has an even number of cylinders, each sector of the ring preferably has an even number of small poles and one large pole. When the engine has an odd number of cylinders, each sector of the ring preferably has an odd number of small poles and one large pole. Preferably, the angular extent of a large magnetic pole is one and a half times greater than the extent of a small magnetic pole.

The Hall-effect sensor includes a sensitive element and an electronic shaping circuit making it possible to provide, on the one hand, an analog signal proportional to the magnetic field generated by the ring, and on the other hand, a corresponding digital signal.

The electronic processing interface includes a leading edge monostable, a falling edge monostable and an OR logic gate whose inputs are connected to the outputs of the monostables and whose output delivers a detection signal to the computer for control of electronic injection, the monostables being connected to the digital signal output of the sensor.

The multipolar ring housed inside the injection pump makes it possible to achieve a compact mechanical unit. The single Hall-effect sensor, in conjunction with the multipolar ring, makes it possible not only to detect the speed of rotation of the engine, to pinpoint angularly the top dead center of the engine but also to perform the static timing of the injection pump relative to the engine to which it is attached. It further makes it possible to detect a very low speed of rotation of the engine, thanks to the changes of sign of the magnetic poles of the ring during movement.

Of course, the invention also provides a new and improved process for detection of the angular position and the angular speed of the rotation shaft of an injection pump and an angular speed of the rotation shaft of an injection pump for a multicylinder engine, using a multipolar ring made integral with the shaft of the pump and a Hall-effect sensor which is stationary and placed opposite the periphery of the ring as defined for the detection device of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
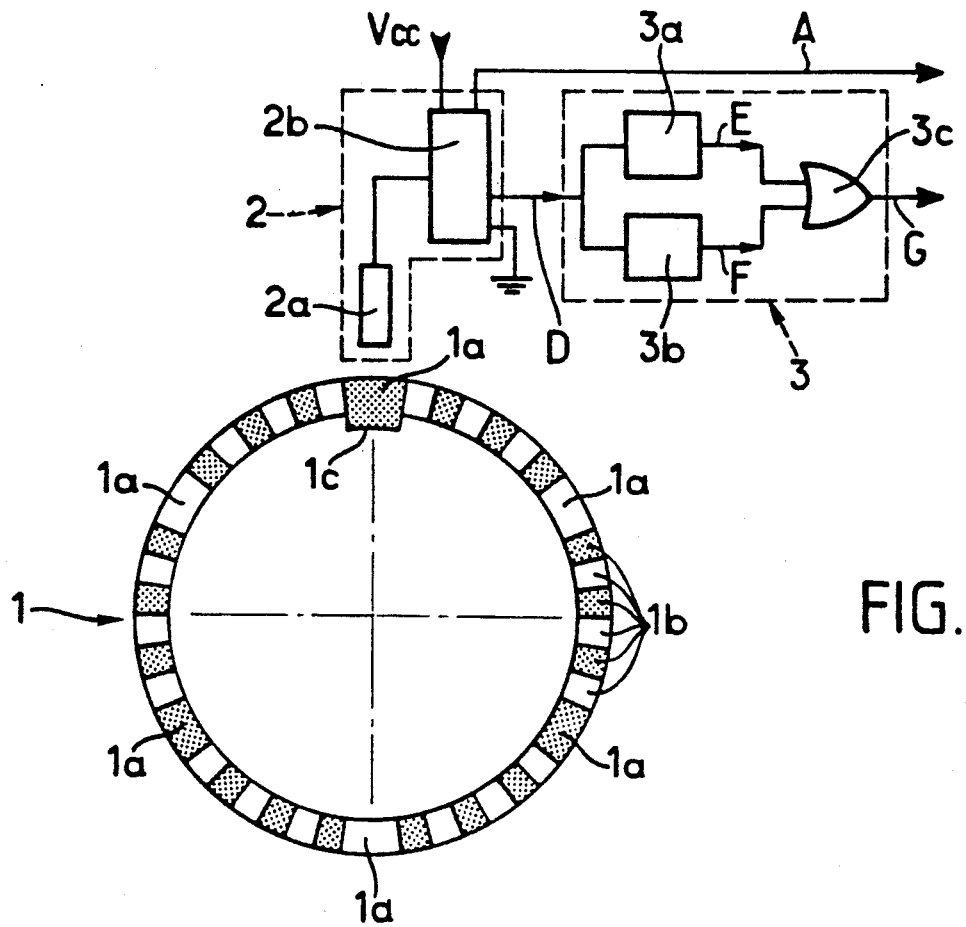
FIG. 1 is a schematic circuit diagram showing the device of the invention for a six-cylinder engine.

Referring now to the drawings, wherein like reference numerals designate identical or corresponding parts throughout the several views, and more particularly to FIG. 1 thereof, the device of the invention includes a rigid multipolar ring 1, a Hall-effect sensor 2 and an electronic processing interface 3.

Multipolar ring 1 includes, in this example for a six-cylinder engine, not shown, forty-two alternate north (N)/south (S) magnetic poles distributed over 360°. It is broken down into six sectors of 60° each consisting of seven alternately N/S consecutive magnetic poles, with the seventh magnetic pole 1a being two times longer than the six other magnetic poles 1b.

Figure 2:
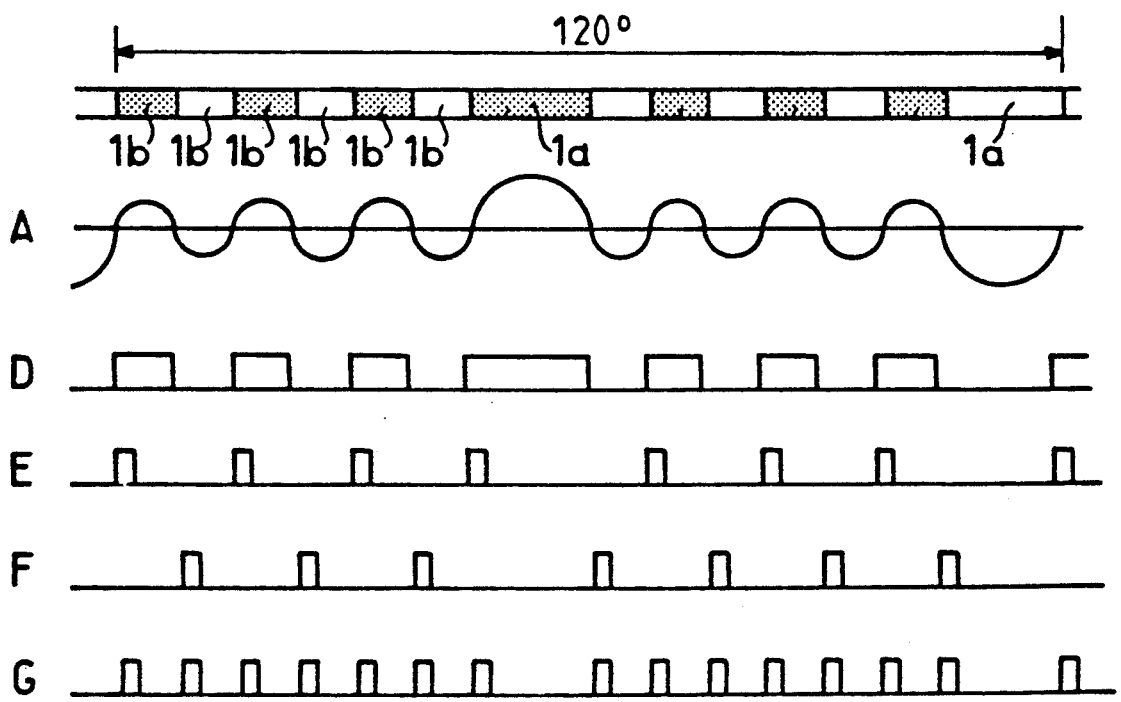
FIG. 2 is a waveform timing diagram showing signals generated by the device of FIG. 1 corresponding to an angular rotation of 120° of the multipolar ring.

In FIGS. 1 and 2, the north magnetic poles are shown by the dark areas, and the south magnetic poles by the light areas. Large magnetic poles 1a each exhibit an angular extent of 15° and are uniformly distributed over the ring. Small magnetic poles 1b each exhibit an angular extent of 7.5° and are grouped in numbers of six between two large consecutive poles 1a.

Ring 1 can be made of plastoferrite or of other rigid materials including magnetic poles. To be able to attach ring 1 inside the injection pump, not shown, the diameter of the ring made is on the order of 40 mm. The ring can be attached to a disk which itself is attached to the rotation shaft, not shown, of the injection pump. Radial protuberance 1c on ring 1 makes it possible to immobilize angularly the ring relative to the rotation shaft of the injection pump, in a way known to one skilled in the art.

The injection pump is driven in rotation either directly or indirectly by the engine. The speed of rotation of ring 1 is therefore directly linked to the speed of rotation of the engine. Each 60° sector of ring 1 corresponds to one of the six cylinders of the engine.

Hall-effect sensor 2 is immobile and attached opposite multipolar ring 1. It consists of a sensitive element or Hall cell 2a and an electronic shaping circuit 2b. Electronic shaping circuit 2b is fed by dc voltage Vcc and delivers an analog signal A and a digital signal D when multipolar ring 1 is in movement.

Sensor 2 makes it possible to detect the successive passage of various magnetic poles when multipolar ring 1 is in rotation o to determine the precise location of the magnetic poles when ring 1 is immobile. A detection of the speed of rotation of ring 1 and an angular pinpointing of the cylinders result from this.

Electronic processing interface 3 makes it possible to transform the electrical data coming from sensor 2 into pulses necessary for the computer for control of the electronic injection. The input of interface 3 is connected to the output digital signal D of sensor 2. Two monostables 3a and 3b are connected electrically in parallel and each receive digital signal D from sensor 2. Monostables 3a and 3b, constituents of interface 3, are respectively of leading edge type and falling edge type. They make it possible to deliver a positive pulse calibrated to each angular reference present in digital signal D of sensor 2 corresponding to the passage of the boundaries between their different magnetic poles.

First monostable 3a is triggered on positive going leading edges of digital signal D coming from sensor 2. Second monostable 3b is triggered on negative going trailing edges of the digital signal D. Signals E and F respectively output from the two monostables 3a and 3b then are added by an OR logic gate 3c which then provides a detection signal G.

The device makes it possible to generate, with 21 pairs of magnetic poles, 42 pulses per rotation of multipolar ring 1. Generated detection signal G is identical with all the 60° sectors, with seven pulses distant by 7.5°, then 15° without pulses.

Signal G is intended for a computer for control, not shown, of the electronic injection which first of all performs a deciphering of signal G, by counting pulses of signal G with a clock, for example, to know the speed of rotation of multipolar ring 1 and the instantaneous location of large poles 1a of the ring to control the injectors for the engine cylinders in a suitable manner, known to one skilled in the art.

Thus, the device of the invention makes it possible, on the one hand, to detect the speed of rotation of the engine, and on the other hand, to perform an angular pinpointing of the top dead center of each cylinder of the engine thanks to large poles 1a of each sector of multipolar ring 1

It is also possible to use the electrical data coming from the device to time the injection pump angularly relative to the engine.

The engine being positioned at the top dead center of a given cylinder, the timing operation consists in positioning the injection pump at a given angular value relative to the injection time. By simultaneous analysis of analog signal A and of digital signal D delivered by sensor 2, an automation can identify, by driving the injection pump in rotation, the value of analog signal A either corresponding to the center of the pole concerned (maximum) or to the boundary between two consecutive poles (switching of digital signal D). As soon as one of these two values is identified by rotation, the automation can slave the injection pump to a recognized angular value.

If the operation is performed manually, a control of electrical signals A and D from sensor 2 makes it possible for the operator to know precisely the analog value corresponding to the center of the pole or to the transition between two magnetic poles. This assistance makes it possible for the operator to position the pump with precision at a given angular value.

Obviously, numerous modifications and variations of the present invention are possible in light of the above teachings. It is therefore to be understood that within the scope of the appended claims, the invention may be practiced otherwise than a specifically described herein.

WHAT IS CLAIMED AS NEW AND DESIRED TO BE SECURED BY LETTERS PATENT OF THE UNITED STATES IS:

1. Detection device connected to an injection pump of a multicylinder engine for measuring the speed of rotation of the engine, pinpointing angularly the top dead center corresponding to each cylinder of the engine and performing a static timing of the injection pump, comprising:

a rigid ring mounted on a rotation shaft of the pump inside the pump;

a sensor sensitive to magnetic field attached inside the pump opposite the ring, wherein said sensor is a Hall-effect sensor comprising a sensitive element and an electronic shaping circuit to provide an analog signal which is proportional to the magnetic field generated by the ring and a corresponding digital signal;

an electronic processing interface connected, on the one hand, to the sensor, and on the other hand, to a computer for control of the electronic injection; and said ring circumferentially comprising plural north and south magnetic poles distributed alternately over the entire circumference of the ring and grouped in equal angle sectors, the number of sectors being equal to the number of cylinders of the engine, each sector comprising at least two small consecutive poles and one large pole at one end.

2. Detection device according to claim 1, wherein:
all said small magnetic poles of said ring are geometrically identical; and
said large magnetic poles have a number corresponding to the number of cylinders of the engine, are geometrically identical, and distributed regularly over the circumference of the ring.

3. Detection device according to claim 2, wherein when the engine comprises an even number of cylinders, each sector of the ring comprises an even pair of small magnetic poles.

4. Detection device according to claim 2, wherein when the engine comprises an odd number of cylinders, each sector of the ring comprises an odd number of small magnetic poles.

5. Detection device according to claim 1, wherein when the engine comprises an even number of cylinders, each sector of the ring comprises an even pair of small magnetic poles.

6. Detection device according to claim 1, wherein when the engine comprises an odd number of cylinders, each sector of the ring comprises an odd number of small magnetic poles.

7. Detection device according to claim 1, wherein said electronic processing interface comprises:
a leading edge monostable, a trailing edge monostable and an OR logic gate having inputs connected respectively to said two monostables and having an output which delivers a detection signal to a computer for control of the electronic injection, said monostables having inputs connected to the output digital signal of said sensor.

8. Detection device connected to an injection pump of a multicylinder engine for measuring the speed of rotation of the engine, pinpointing angularly the top dead center corresponding to each cylinder of the engine and performing a static timing of the injection pump, comprising:
a rigid ring mounted on a rotation shaft of the pump inside the pump;
a sensor sensitive to magnetic field attached inside the pump opposite the ring;
an electronic processing interface connected, on the one hand, to the sensor, and on the other hand, to a computer for control of the electronic injection, comprising a leading edge monostable, a trailing edge monostable and OR logic gate having inputs connected respectively to said two monostables and having an output which delivers a detection signal to a computer for control of the electronic injection, said monostables having inputs connected to the output digital signal of said sensor; and
said ring circumferentially comprising plural north and south magnetic poles distributed alternately over the entire circumference of the ring and grouped in equal angle sectors, the number of sectors being equal to the number of cylinders of the engine, each sector comprising at least two small consecutive poles and one large pole at one end.

9. Detection device according to claim 8, wherein:
all said small magnetic poles of said ring are geometrically identical; and
said large magnetic poles have a number corresponding to the number of cylinders of the engine, are geometrically identical, and distributed regularly over the circumference of the ring.

10. Detection device according to claim 8, wherein when the engine comprises an even number of cylinders, each sector of the ring comprises an even pair of small magnetic poles.

11. Detection device according to claim 8, wherein when the engine comprises an odd number of cylinders, each sector of the ring comprises an odd number of small magnetic poles.

* * * * *